(12) United States Patent
Furukawa et al.

(10) Patent No.: US 12,338,315 B2
(45) Date of Patent: Jun. 24, 2025

(54) EPOXY RESIN COMPOSITION, PREPREG, AND FIBER REINFORCED COMPOSITE MATERIAL

(71) Applicant: TORAY INDUSTRIES, INC., Tokyo (JP)

(72) Inventors: Koji Furukawa, Iyo-gun (JP); Kentaro Sano, Iyo-gun (JP); Junko Kawasaki, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 570 days.

(21) Appl. No.: 17/772,574

(22) PCT Filed: Nov. 5, 2020

(86) PCT No.: PCT/JP2020/041333
§ 371 (c)(1),
(2) Date: Apr. 28, 2022

(87) PCT Pub. No.: WO2021/095627
PCT Pub. Date: May 20, 2021

(65) Prior Publication Data
US 2023/0037333 A1 Feb. 9, 2023

(30) Foreign Application Priority Data
Nov. 15, 2019 (JP) .................................. 2019-206896

(51) Int. Cl.
*C08G 59/24* (2006.01)
*C08G 59/50* (2006.01)
(Continued)

(52) U.S. Cl.
CPC ....... *C08G 59/245* (2013.01); *C08G 59/5033* (2013.01); *C08J 5/042* (2013.01);
(Continued)

(58) Field of Classification Search
CPC .... C08G 59/245; C08G 59/5033; C08J 5/243; C08J 5/042; C08J 2363/00; C08K 5/053; C08K 5/07; C08K 5/20
(Continued)

(56) References Cited

U.S. PATENT DOCUMENTS

2017/0247503 A1 8/2017 Qian et al.
2019/0134926 A1 5/2019 Aerts et al.

FOREIGN PATENT DOCUMENTS

| CN | 109265655 A | 1/2019 |
| JP | 2008-95013 A | 4/2008 |
| JP | 2009-155431 A | 7/2009 |
| JP | 2010-77176 A | 4/2010 |
| JP | 2014-227473 A | 12/2014 |
| JP | 2017-535652 A | 11/2017 |

OTHER PUBLICATIONS

Nakamura et al., JP 2008-095013 A machine translation in English, Apr. 24, 2008. (Year: 2008).*
(Continued)

*Primary Examiner* — David T Karst
(74) *Attorney, Agent, or Firm* — Birch, Stewart, Kolasch & Birch, LLP

(57) ABSTRACT

An epoxy resin composition includes the following components: [A] epoxy resin, [B] aromatic diamine, and [C] a compound having a boiling point of 130° C. or more, a molecular weight m of 50 to 250 no epoxy group in the molecule and substantially no ability to cure an epoxy resin. The composition also satisfies the following conditions: (1) the ratio H/E between moles E of epoxy groups in [A] and moles H of active hydrogen in [B] is 0.50 to 1.30; (2) at least a part of component [C] satisfies a ratio m/M in a range of 0.10 to 0.60 of the molecular weight m thereof to a theoretical molecular weight between crosslinking points, M, of a cured product of the epoxy resin composition; (3) the ratio C/E of moles E of epoxy groups of [A] to moles C of [C] satisfying condition (2) is 0.01 to 0.20.

4 Claims, 2 Drawing Sheets

(51) Int. Cl.
  *C08J 5/04*    (2006.01)
  *C08J 5/24*    (2006.01)
  *C08K 5/053*   (2006.01)
  *C08K 5/07*    (2006.01)
  *C08K 5/20*    (2006.01)

(52) U.S. Cl.
  CPC ............... *C08J 5/243* (2021.05); *C08K 5/053* (2013.01); *C08K 5/07* (2013.01); *C08K 5/20* (2013.01); *C08J 2363/00* (2013.01)

(58) Field of Classification Search
  USPC ....................................................... 525/523
  See application file for complete search history.

(56) References Cited

OTHER PUBLICATIONS

Westlake Epoxy, "Epikote Resin 828EL", Apr. 1, 2008. (Year: 2008).*
Univar Solutions, "Safety Data Sheet Polyethylene Glycol 200", Nov. 11, 2023. (Year: 2023).*
International Search Report, issued in PCT/JP2020/041333, PCT/ISA/210, dated Jan. 19, 2021.
Written Opinion of the International Searching Authority, issued in PCT/JP2020/041333, PCT/ISA/237, dated Jan. 19, 2021.
Extended European Search Report for European Application No. 20887472.7, dated Oct. 30, 2023.

* cited by examiner

EPOXY RESIN COMPOSITION, PREPREG, AND FIBER REINFORCED COMPOSITE MATERIAL

TECHNICAL FIELD

The present invention relates to an epoxy resin composition preferably used for fiber reinforced composite materials for aerospace applications, general industrial applications, and sports applications, and a prepreg and a fiber reinforced composite material using the epoxy resin composition.

BACKGROUND ART

Fiber reinforced composite materials in which carbon fibers, aramid fibers and the like are used as reinforcing fibers are widely utilized in structural materials such as aircraft and motor vehicles, sports applications such as tennis rackets, golf shafts, fishing rods, bicycles, and housings, and general industrial applications, due to the high specific strength and specific elastic modulus thereof. As the resin composition to be used for this fiber reinforced composite material, a thermosetting resin is mainly used from the viewpoint of heat resistance and productivity, and of these, an epoxy resin is preferably used from the viewpoint of mechanical properties such as adhesive property with a reinforcing fiber.

In recent years, in order to apply a fiber reinforced composite material to applications requiring further weight reduction, it is necessary to improve various physical properties. Therefore, for the purpose of improving various mechanical properties of the fiber reinforced composite material, improvement of the elastic modulus, elongation, and strength of the epoxy resin used as the matrix resin is required. However, an epoxy resin cured product having a high elastic modulus is generally brittle, and tends to have low elongation and strength. Therefore, it is a technical problem to simultaneously improve high elastic modulus, elongation, and strength.

In order to improve this problem, various investigations have been performed. For example, there has been investigated a method for improving the elastic modulus and strength by combining an epoxy resin having a specific structure and a nanofiller (Patent Document 1). In addition, there has been investigated a method for improving the resin strength by compounding an additive in order to prevent the dicyandiamide used as a curing agent from remaining dissolved and becoming a defect (Patent Document 2). In addition, there has been investigated a method for using a liquid curing agent that hardly causes defects in a resin composition for an RTM molding method (Patent Document 3).

PRIOR ART DOCUMENTS

Patent Documents

Patent Document 1: Japanese Patent Laid-open Publication No. 2018-95675
Patent Document 2: WO 2019-181402
Patent Document 3: Japanese Patent Laid-open Publication No. 2014-227473

SUMMARY OF THE INVENTION

Problems to be Solved by the Invention

When the technique of Patent Document 1 is used, mechanical properties of the resulting cured resin or fiber reinforced composite material are insufficient, and further improvement of the mechanical properties is required. In addition, when the technique of Patent Document 2 is used, the effect of improving the resin strength can be obtained; however, the improvement of the elastic modulus is not considered at all, and a technique capable of improving both the elastic modulus and the strength is required. In addition, when the technique of Patent Document 3 is used, the resin composition has high reactivity and does not have a sufficient pot life for use in prepreg applications.

Therefore, an object of the present invention is to provide an epoxy resin composition that can be preferably used for prepreg and fiber reinforced composite material applications and is excellent in elastic modulus, strength, and pot life.

Solutions to the Problems

The present invention adopts the following means in order to solve the problems. That is, the epoxy resin composition includes the following components [A] to [C] and satisfies the following conditions (1) to (4):

[A]: epoxy resin
[B]: aromatic diamine
[C]: a compound having a boiling point of 130° C. or more and a molecular weight m of 50 or more and 250 or less, the compound having no epoxy group in the molecule and having substantially no curing ability of an epoxy resin (1): the ratio H/E between the amount by mole, E, of the epoxy group in the component [A] and the amount by mole, H, of active hydrogen in the component [B] is 0.50 or more and 1.30 or less.

(2): at least a part of the component [C] satisfies 0.10 or more and 0.60 or less in a ratio m/M of a molecular weight m thereof to a theoretical molecular weight between crosslinking points, M, of a cured product of the epoxy resin composition.

(3): the ratio C/E of the amount by mole, E, for epoxy groups of the component [A] to the amount by mole, C, of the component [C] satisfying the condition (2) is 0.01 or more and 0.20 or less; and (4): the viscosity at 70° C. for 2 hours is 5.0 times or less the initial viscosity at 70° C.

In addition, the present invention provides a prepreg including the epoxy resin composition of the present invention and a reinforcing fiber.

In addition, the present invention provides a fiber reinforced composite material including a cured product of the epoxy resin composition of the present invention and a reinforcing fiber.

Effects of the Invention

The present invention can provide an epoxy resin composition excellent in elastic modulus, strength, and pot life, the epoxy resin composition capable of being preferably used for prepreg and fiber reinforced composite material applications.

(C/E=0.16), Comparative Example 1 (C/E=0.00), and Comparative Example 8 (C/E=0.23).

Figure 2:
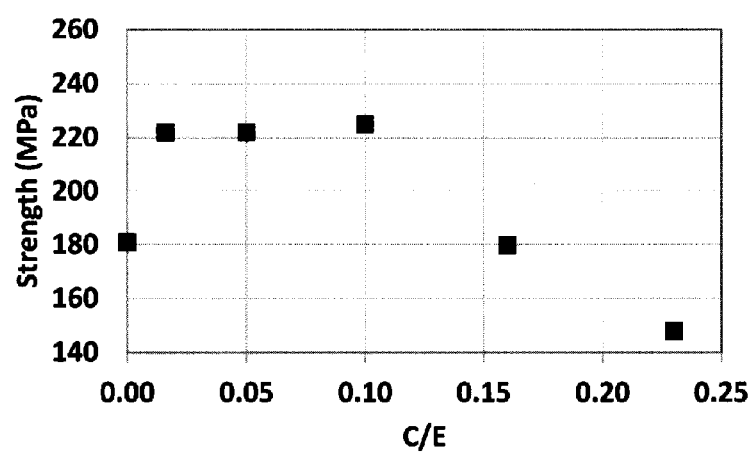

FIG. 2 is a graph showing the relationship between the ratio C/E of the amount by mole, C, of the component [C] to the amount by mole, E, of epoxy groups of the component [A], and the strength, in Example 2 (C/E=0.10), Example 5 (C/E=0.02), Example 6 (C/E=0.05), Example 7 (C/E=0.16), Comparative Example 1 (C/E=0.00), and Comparative Example 8 (C/E=0.23).

Figure 3:
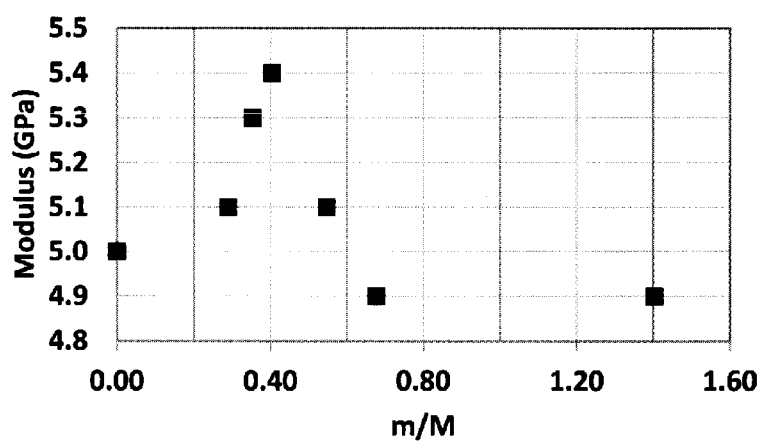

FIG. 3 is a graph showing the relationship between the ratio m/M of the molecular weight m of the component [C] to the theoretical molecular weight between crosslinking points, M, of a cured product of an epoxy resin composition and the elastic modulus in Example 1 (m/M=0.29), Example 2 (m/M=0.35), Example 3 (m/M=0.55), Example 4 (m/M=0.40), Comparative Example 1, Comparative Example 4 (m/M=1.40), and Comparative Example 9 (m/M=0.68). In Comparative Example 1 in which the component [C] was not included, the plot is made at the position of m/M=0.00.

Figure 4:
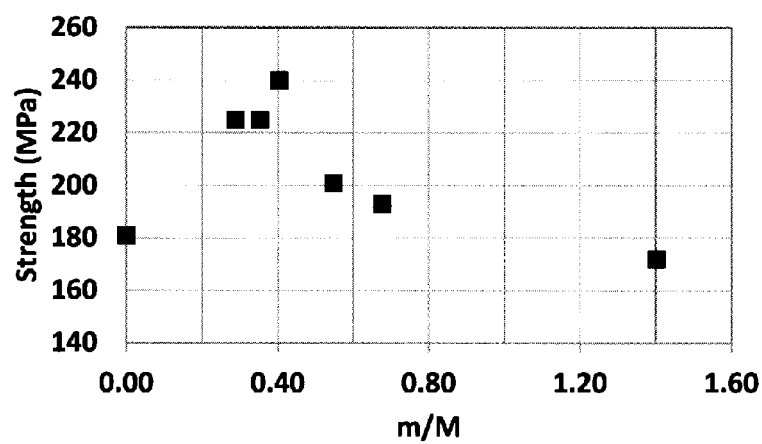

FIG. 4 is a graph showing the relationship between the ratio m/M of the molecular weight m of the component [C] to the theoretical molecular weight between crosslinking points, M, of a cured product of an epoxy resin composition and the strength in Example 1 (m/M=0.29), Example 2 (m/M=0.35), Example 3 (m/M=0.55), Example 4 (m/M=0.40), Comparative Example 1, Comparative Example 4 (m/M=1.40), and Comparative Example 9 (m/M=0.68). In Comparative Example 1 in which the component [C] was not included, the plot is made at the position of m/M=0.00.

EMBODIMENTS OF THE INVENTION

Hereinafter, the present invention will be described in detail. In the present invention, "or more" means the same as or more than the numerical value indicated therein. In addition, "or less" means the same as or less than the numerical value indicated therein.

The resin composition of the present invention includes the components [A] to [C] as essential components. In the present invention, the "component" means a compound included in the composition.

The component [A] in the present invention is an epoxy resin. The epoxy resin of the component [A] is preferably an epoxy resin including two or more epoxy groups in one molecule, because of allowing increasing the glass transition temperature of a cured product obtained by thermally curing the resin composition and improving the heat resistance. In addition, an epoxy resin including one epoxy group in one molecule may be compounded. These epoxy resins may be used singly or may be appropriately used in combination.

Examples of the epoxy resin of the component [A] include epoxy resins such as diaminodiphenylmethane type, diaminodiphenylsulfone type, aminophenol type, bisphenol type, metaxylenediamine type, 1,3-bisaminomethylcyclohexane type, isocyanurate type, hydantoin type, phenol novolac type, orthocresol novolac type, trishydroxyphenylmethane type, and tetraphenylolethane type. Of these, epoxy resins such as diaminodiphenylmethane type, aminophenol type, and bisphenol type are particularly preferably used, because of having a good balance of physical properties.

Examples of commercially available products of the diaminodiphenylmethane epoxy resin include ELM434 (manufactured by Sumitomo Chemical Co., Ltd.), "Araldite®" MY720 (manufactured by Huntsman Advanced Materials LLC), "Araldite®" MY721 (manufactured by Huntsman Advanced Materials LLC.), "Araldite®" MY9512 (manufactured by Huntsman Advanced Materials LLC.), "Araldite®" MY9663 (manufactured by Huntsman Advanced Materials LLC.), and "Epotohto®" YH-434 (manufactured by Tohto Kasei Co., Ltd.), and "jER®" 630 (manufactured by Mitsubishi Chemical Corporation).

Examples of commercially available products of the diaminodiphenyl sulfone type epoxy resin include TG3DAS (manufactured by Mitsui Fine Chemicals, Inc.).

Examples of commercially available products of the aminophenol type epoxy resin include ELM120 (manufactured by Sumitomo Chemical Co., Ltd.), ELM100 (manufactured by Sumitomo Chemical Co., Ltd.), "jER®" 630 (manufactured by Mitsubishi Chemical Corporation), "Araldite®" MY0500 (manufactured by Huntsman Advanced Materials LLC.), "Araldite®" MY0510 (manufactured by Huntsman Advanced Materials LLC.), "Araldite®" MY0600 (manufactured by Huntsman Advanced Materials LLC.), and "Araldite®" MY0610 (manufactured by Huntsman Advanced Materials LLC.).

Examples of commercially available products of the bisphenol A type epoxy resin include "EPON (registered trademark)" 825 (manufactured by Mitsubishi Chemical Corporation), "EPICLON®" 850 (manufactured by DIC Corporation), "Epotohto®" YD-128 (manufactured by Tohto Kasei Co., Ltd.), and DER-331 and DER-332 (manufactured by The Dow Chemical Company).

Examples of commercially available products of the bisphenol F type epoxy resin include "Araldite®" GY282 (manufactured by Huntsman Advanced Materials LLC.), "jER®" 806, "jER®" 807, "jER®" 1750 (manufactured by Mitsubishi Chemical Corporation), "EPICLON®" 830 (manufactured by DIC Corporation), and "Epotohto®" YD-170 (manufactured by Tohto Kasei Co., Ltd.).

In addition, in the epoxy resin composition of the present invention, an epoxy compound other than the above compound may be appropriately compounded.

The component [B] in the present invention is an aromatic diamine. The polyamine in which the aromatic diamine is included in the group has a plurality of amino groups capable of reacting with an epoxy group, and functions as a curing agent. Aromatic polyamines, particularly aromatic diamines, are excellent as curing agents in that the cured epoxy resin can be provided with high mechanical properties and heat resistance.

Examples of those classified as aromatic diamines include diethyltoluenediamine such as 2,2'-diethyldiaminodiphenylmethane, 2,4-diethyl-6-methyl-m-phenylenediamine, 4,6-diethyl-2-methyl-m-phenylenediamine, and 4,6-diethyl-m-phenylenediamine, 4,4'-methylenebis(N-methylaniline), 4,4'-methylenebis(N-ethylaniline), 4,4'-methylenebis(N-sec-butylaniline), N,N'-di-sec-butyl-p-phenylenediamine, 4,4'-diaminodiphenylmethane, 3,3'-diaminodiphenylsulfone, 4,4'-diaminodiphenylsulfone, 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3'-di-t-butyl-5,5'-diisopropyl-4,4'-diaminodiphenylmethane, and 3,3',5,5'-tetra-t-butyl-4,4'-diaminodiphenylmethane. Of these, 3,3'-diaminodiphenyl sulfone and 4,4'-diaminodiphenyl sulfone are preferable, because the resulting cured product has excellent mechanical properties. In addition, a solid one is preferably used as the aromatic diamine, and at least one of 3,3'-diaminodiphenyl sulfone and 4,4'-diaminodiphenyl sulfone is particularly preferably included, from the viewpoint that an increase in viscosity when the epoxy resin composition of the present invention is held at 70° C. can be suppressed, and consequently the pot life can be effectively improved.

Examples of commercially available products of the aromatic diamine include Seikacure-S (manufactured by Wakayama Seika Kogyo Co., Ltd.), MDA-220 (manufactured by Mitsui Chemicals, Inc.), "jER Cure®" WA (manufactured by Mitsubishi Chemical Corporation), 3,3'-DAS (manufactured by Mitsui Chemicals, Inc.), "Lonzacure®" M-DEA (manufactured by Lonza Inc.), "Lonzacure®" M-DIPA (manufactured by Lonza Inc.), "Lonzacure®" M-MIPA (manufactured by Lonza Inc.), and "Lonzacure (registered trademark)" DETDA 80 (manufactured by Lonza Inc.).

As the compounding amount of the aromatic diamine in the present invention, the ratio H/E between the amount by mole, E, of the epoxy group of the component [A] to the amount by mole, H, of active hydrogen of the aromatic diamine is important to be 0.50 or more and 1.30 or less (condition (1)), preferably 0.70 or more and 1.20 or less, and more preferably 0.80 or more and 1.10 or less. Setting H/E within such a range can appropriately form a cross-linked structure by the reaction between the epoxy resin and the aromatic diamine, and a cured resin having excellent strength and elongation can be obtained. In addition, setting H/E to 0.80 or more and 1.10 or less easily retains the component [C] to be described later in the cross-linked structure, and the effect of improving the elastic modulus, strength, and elongation is obtained.

In addition, in the epoxy resin composition of the present invention, the ratio between the amount by mole, E, of epoxy groups in the component [A] and the total amount by mole for at least one of 3,3'-diaminodiphenyl sulfone and 4,4'-diaminodiphenyl sulfone ((total amount by mole for at least one of 3,3'-diaminodiphenyl sulfone and 4,4'-diaminodiphenyl sulfone)/E) is preferably 0.50 or more and 1.30 or less. At 0.50 or more and 1.30 or less, more preferably 0.70 or more and 1.20 or less, further preferably 0.80 or more and 1.10 or less, an increase in viscosity when the epoxy resin composition of the present invention is held at 70° C. can be suppressed, and consequently, the pot life can be effectively improved.

The component [C] is a compound having a boiling point of 130° C. or more, a molecular weight m of 50 or more and 250 or less, having no epoxy group in the molecule, and substantially having no curing ability of an epoxy resin. Herein, compounds such as an amine and a phenol that can undergo an addition reaction with the epoxy resin, an acid anhydride that can be copolymerized with the epoxy resin, imidazole that can be a self-polymerization reaction initiator of the epoxy resin, an aromatic urea compound, and a tertiary amine compound are compounds having the curing ability of the epoxy resin, and do not correspond to compounds having no curing ability of the epoxy resin.

The component [C] is present in the void portion without being incorporated into the cross-linked structure in the cross-linked structure formed by reaction of the epoxy resin and the aromatic diamine, and the state thereof is maintained after curing. This increases the elastic modulus of the resulting cured epoxy resin. In addition, the inventors surprisingly have found that not only a high elastic modulus but also a cured epoxy resin having high elongation and high strength can be obtained by compounding the component [C]. The reason for this is not clear; however, the inventor considers as follows. The component [C] has no epoxy group in the molecule and substantially has no curing ability of an epoxy resin, thereby generating no reaction with the epoxy resin or the aromatic diamine that forms a cross-linked structure. Therefore, the inventor considers that the component [C] is not bound by a covalent bond with a cross-linked structure formed by reaction of an epoxy resin and an aromatic diamine, and is appropriately held in the voids of the cross-linked structure, whereby voids in the cured product can be effectively filled, and the elastic modulus of the cured product is increased. In addition, the inventor considers that when distortion is imparted to the cured product, the component [C] can freely move in the cross-linked structure, and therefore the strain energy up to destruction can be relaxed, and the elongation and strength of the cured product are increased.

The boiling point of the component [C] is 130° C. or more, more preferably 180° C. or more, whereby volatilization of the component [C] when the epoxy resin composition is cured can be suppressed, and a cured resin or a fiber reinforced composite material excellent in mechanical properties can be obtained. Furthermore, generation of voids and deterioration of mechanical properties in the obtained fiber reinforced composite material can be suppressed. In the present invention, the boiling point is a value at normal pressure (101 kPa). In addition, when the boiling point at normal pressure cannot be measured, a converted boiling point converted to 101 kPa in a boiling point conversion table can be used.

The molecular weight m of the component [C] is 50 or more and 250 or less, and more preferably 70 or more and 120 or less. Setting the molecular weight of the component [C] within such a range appropriately retains the component [C] in voids of a cross-linked structure formed by reaction of an epoxy resin and an aromatic diamine, and a cured product excellent in elastic modulus, strength, and elongation is obtained.

The component [C] is preferably a compound having at least one functional group selected from the group consisting of an amide group, a ketone group, and a hydroxyl group in the molecule. The component [C] has a highly polar functional group as described above in the molecule, whereby a strong intermolecular interaction acts between the hydroxyl group in the cross-linked structure formed by the component [A] and the component [B], and the component [C], and the component [C] is easily and appropriately retained in the voids of the cross-linked structure, and therefore a particularly excellent effect of improving the elongation and strength is obtained.

The component [C] includes: amides such as N-methylformamide, N-methylacetamide, 2-pyrrolidone, N-methylpropionamide, N-ethylacetamide, N-methylacetanilide, and N,N'-diphenylacetamide; and diols such as ethanediol, propanediol, butanediol, pentanediol, hexanediol, and heptanediol. These compounds may be used singly or appropriately used in combination.

The theoretical molecular weight between crosslinking points, M, of the epoxy resin composition of the present invention is preferably 500 or less, more preferably 400 or less, and still more preferably 250 or less. The theoretical molecular weight between crosslinking points, M, is preferably in such a range, because the component [C] is easily retained in the voids of the cross-linked structure formed by the reaction between the epoxy resin and the aromatic diamine, and a cured product particularly excellent in elastic modulus, strength, and elongation is obtained.

Herein, the theoretical molecular weight between crosslinking points, M, is values derived by calculation from each component constituting the epoxy resin composition, and are values obtained by dividing the mass W of all cured resins obtained by curing the epoxy resin composition by the number N of crosslinking points of all cured resins. That is, it is considered that the void size in the cross-linked structure is larger as M is larger. Herein, the mass W of the all cured resins means the total mass of all epoxy resin components and polyamine components included in the epoxy resin composition, and the other components are not included in the calculation.

The theoretical molecular weight between crosslinking points, M, is determined by the calculation described below. When k types (k is an integer) of epoxy resin components are included in the epoxy resin composition, the compounding amount of the i-th (i is an integer of 1 to k) epoxy resin component among them is $a_i$ (unit: g). In addition, when the epoxy resin composition includes l types (l is an integer) of polyamine components and the compounding amount of the j-th (j is an integer of 1 to l) polyamine among them is $b_j$ (unit: g), the mass W (unit: g) of the all cured resins is obtained by formula (1).

[Mathematical Formula 1]

$$W = \sum_{i=1}^{k} a_i + \sum_{j=1}^{l} b_j \qquad \text{Formula (1)}$$

The epoxy equivalent of the i-th epoxy resin component is $E_i$, and the number of the epoxy group possessed by one molecule of the i-th epoxy resin component is $x_i$. In addition, the active hydrogen equivalent of the j-th polyamine component is $H_j$, and the number of the active hydrogen possessed by one molecule of the j-th polyamine component is $y_j$. The number N of crosslinking points included in the all cured resins is determined differently depending on the case where the compounding ratio between the epoxy resin and the polyamine is stoichiometric amount, the case where the polyamine is excessive, or the case where the epoxy resin is excessive. The determination method to be adopted depends on a compounding ratio index $\beta$, which is obtained by formula (2), representing a compounding ratio between the epoxy resin and the polyamine.

[Mathematical Formula 2]

$$\beta = \sum_{j=1}^{l} \frac{b_j}{H_j} \Big/ \sum_{i=1}^{k} \frac{a_i}{E_i} \qquad \text{Formula (2)}$$

Herein, when $\beta=1$, the compounding ratio between the epoxy resin and the polyamine is a stoichiometric amount, and the number N of crosslinking points is obtained by formula (3). The number N of crosslinking points represents the number of crosslinking points generated by the reaction between all the reactive epoxy groups and the active hydrogen of all the polyamines.

[Mathematical Formula 3]

$$N = \sum_{i=1}^{k} \left\{ \frac{a_i}{E_i \times x_i} \times (x_i - 2) \right\} + \sum_{j=1}^{l} \left\{ \frac{b_j}{H_j \times y_j} \times (y_j - 2) \right\} \quad \text{Formula (3)}$$

In addition, when $\beta>1$, the polyamine is in excess of the stoichiometric amount, and the number N of crosslinking points is obtained by formula (4).

[Mathematical Formula 4]

$$N = \sum_{i=1}^{k} \left\{ \frac{a_i}{E_i \times x_i} \times (x_i - 2) \right\} + \frac{1}{\beta} \times \sum_{j=1}^{l} \left\{ \frac{b_j}{H_j \times y_j} \times (y_j - 2) \right\} \quad \text{Formula (4)}$$

In addition, when $\beta<1$, the epoxy resin is in excess of the stoichiometric amount, and the number N of crosslinking points is obtained by formula (5).

[Mathematical Formula 5]

$$N = \beta \times \sum_{i=1}^{k} \left\{ \frac{a_i}{E_i \times x_i} \times (x_i - 2) \right\} + \sum_{j=1}^{l} \left\{ \frac{b_j}{H_j \times y_j} \times (y_j - 2) \right\} \quad \text{Formula (5)}$$

Herein, $E_i \times x_i$ and $H_j \times y_j$ represent the average molecular weight of the i-th epoxy resin component and the average molecular weight of the j-th polyamine component, respectively. In addition, $(x_i-2)$ represents the number of crosslinking points generated when all the epoxy groups in one molecule of the i-th epoxy resin component react with the active hydrogen of the polyamine and are incorporated into the cross-linked structure. In addition, $(y_j-2)$ represents the number of crosslinking points generated when all the active hydrogens in one molecule of the j-th polyamine react with the epoxy group and are incorporated into the cross-linked structure. For example, when the i-th epoxy resin component is a tetrafunctional epoxy resin, one molecule has four epoxy groups, and the number of crosslinking points generated is 4-2, that is 2. In the case of a monofunctional epoxy resin, the number of crosslinking points generated is calculated as 0. In addition, when the j-th polyamine component has two active hydrogens per molecule, the number of crosslinking points generated is 2-2, that is, 0. The theoretical molecular weight between crosslinking points, M, is determined by formula (6), using W and N determined by the above formula.

[Mathematical Formula 6]

$$M = \frac{W}{N} \qquad \text{Formula (6)}$$

Herein, as an example, the theoretical molecular weight between crosslinking points, M, is determined for the cured resin of the epoxy resin composition composed of 90 g of an epoxy resin 1 (number of epoxy groups: 3, epoxy equivalent: 98 g/eq), 10 g of an epoxy resin 2 (number of epoxy groups: 2, epoxy equivalent: 135 g/eq), and 44.7 g of a polyamine 1 (number of active hydrogen: 4, active hydrogen equivalent: 45 g/eq). The mass W of the all cured resins is 144.7 g according to the formula (1). In addition, $\beta$ obtained by the formula (2) is 1, and therefore the number N of crosslinking points of the all cured resins is obtained as 0.803 by the formula (3). Therefore, the theoretical molecular weight between crosslinking points, M, of the cured resin is determined to be 180 by the formula (6).

In the epoxy resin composition of the present invention, it is also important that at least a part of the component [C] satisfies 0.10 or more and 0.60 or less in a ratio m/M of a molecular weight m thereof to a theoretical molecular weight between crosslinking points, M, of a cured product of the epoxy resin composition (condition (2)). In the present invention, the elastic modulus, strength, and elongation of the cured resin are improved by compounding the component [C] having an appropriate molecular weight with respect to the void size of the cross-linked structure formed by the reaction between the epoxy resin and the aromatic diamine. However, the void size of the cross-linked structure formed by the reaction between the epoxy resin and the aromatic diamine varies one by one depending on the type of epoxy resin or aromatic diamine used. Therefore, setting m/M within the above range appropriately retains the component [C] in the voids of the cross-linked structure, and a cured product excellent in elastic modulus, strength, and elongation is obtained. Preferably setting m/M to 0.30 or more and 0.50 or less provides a cured product having particularly excellent elastic modulus, strength, and elongation.

In the epoxy resin composition of the present invention, it is important that the ratio C/E of the amount by mole, E, of epoxy groups of the component [A] to the amount by mole, C, of the component [C] satisfying the condition (2) is 0.01 or more and 0.20 or less (condition (3)). Setting C/E within such a range appropriately retains the component [C] in voids of a cross-linked structure formed by reaction of an epoxy resin and an aromatic diamine, and a cured product excellent in elastic modulus, strength, and elongation is obtained. In addition, setting the m/M to 0.30 or more and 0.50 or less and further setting C/E to preferably 0.07 or more and 0.20 or less provide a cured product having a particularly high elastic modulus. In addition, setting the m/M to 0.30 or more and 0.50 or less and further setting C/E to preferably 0.01 or more and 0.13 or less provide a cured product having a particularly high strength. Furthermore, setting the m/M to 0.30 or more and 0.50 or less and further setting C/E to preferably 0.07 or more and 0.13 or less provides a cured product having particularly excellent both elastic modulus and strength.

It is also important that the viscosity of the resin composition of the present invention when held at 70° C. for 2 hours is 5.0 times or less the initial viscosity at 70° C. (condition (4)). Setting the ratio (also referred to as "viscosity increase ratio") to 5.0 times or less, more preferably 3.0 times or less, and still more preferably 2.5 times or less reduces the viscosity change of the resin composition in the step of kneading the resin composition or the step of impregnating reinforcing fibers with the resin composition, allowing prolonging the pot life. In addition, variations in the flow amount of the resin composition during molding can be reduced, and variations in the content of the resin included in the fiber reinforced composite material can be suppressed, thereby allowing providing a fiber reinforced composite material having stable dimensions and mechanical characteristics.

The viscosity increase ratio can be effectively suppressed by using a solid aromatic diamine of the component [B], particularly at least one of 3,3'-diaminodiphenyl sulfone and 4,4'-diaminodiphenyl sulfone.

The epoxy resin composition of the present invention is excellent in elastic modulus, strength, and elongation, and is preferably used as a matrix resin of a fiber reinforced composite material. That is, the fiber reinforced composite material of the present invention includes a cured product of the epoxy resin composition of the present invention and a reinforcing fiber.

Examples of a method for obtaining a fiber reinforced composite material include a method in which a reinforcing fiber is impregnated with a resin composition in a molding step, such as a hand lay-up method, an RTM method, a filament winding method, and a pultrusion method, and a method of molding a prepreg in which a reinforcing fiber is previously impregnated with a resin composition by an autoclave method or a press molding method. Of these, the arrangement of the fibers and the ratio of the resin can be precisely controlled and the properties of the composite material can be maximized, and therefore it is preferable to previously prepare a prepreg including an epoxy resin composition and a reinforcing fiber. That is, the prepreg of the present invention includes the epoxy resin composition according to the present invention and a reinforcing fiber.

Preferable examples of the reinforcing fiber used in the prepreg of the present invention and the fiber reinforced composite material of the present invention include carbon fiber, graphite fiber, aramid fiber, and glass fiber, and the carbon fiber is particularly preferable. The form and arrangement of the reinforcing fiber are not limited, and for example, fibrous structures such as a long fiber aligned in one direction, a single tow, woven fabric, knitting, and a braid are used. Two or more types of carbon fibers, glass fibers, aramid fibers, boron fibers, PBO fibers, high-strength polyethylene fibers, alumina fibers, and silicon carbide fibers may be used in combination as the reinforcing fiber.

Specific examples of the carbon fiber include acrylic-based, pitch-based, and rayon-based carbon fibers, and particularly, the acrylic-based carbon fiber having high tensile strength is preferably used.

Twisted yarns, untwisted yarns, and non-twisted yarns can be used as the form of the carbon fibers, and in the case of twisted yarns, the orientation of the filament constituting the carbon fiber is not parallel, thus causing a decrease in mechanical properties of the resulting carbon fiber reinforced composite material, and therefore there are preferably used untwisted yarns or non-twisted yarns having a good balance between moldability and strength properties of the carbon fiber reinforced composite material.

The carbon fiber preferably has a tensile elastic modulus of 200 GPa or more and 440 GPa or less. The tensile elastic modulus of the carbon fiber is affected by the crystallinity of the graphite structure constituting the carbon fiber, and the elastic modulus is improved as the crystallinity is higher. This range is preferable, because all of rigidity and strength of the carbon fiber reinforced composite material are balanced at a high level. The elastic modulus is more preferably 230 GPa or more and 400 GPa or less, still more preferably 260 GPa or more and 370 GPa or less. Herein, the tensile elastic modulus of the carbon fiber is a value measured according to JIS R7608 (2008).

The prepreg of the present invention can be produced by various known methods. For example, a prepreg can be produced by a hot melt method in which a resin composition is heated to reduce the viscosity without using an organic solvent, and a reinforcing fiber is impregnated therewith.

In addition, for the hot melt method, there can be used, for example, a method of directly impregnating a reinforcing fiber with a resin composition whose viscosity has been reduced by heating, or a method of first preparing a release paper sheet with a resin film in which the release paper is once coated with the resin composition, then superimposing the resin film on the reinforcing fiber side from both sides or one side of the reinforcing fiber, and heating and pressurizing to impregnate the reinforcing fiber with the resin composition.

The content of a reinforcing fiber in a prepreg is preferably 30% by mass or more and 90% by mass or less. At 30% by mass or more, more preferably 35% by mass or more, and still more preferably 65% by mass or more, it is easy to obtain an advantage of a fiber reinforced composite material excellent in specific strength and specific modulus. In addition, it is possible to prevent the amount of heat generation during curing from becoming too high during molding of the fiber reinforced composite material. Whereas, at 90% by mass or less, more preferably 85% by mass or less, generation of voids in the composite material due to poor impregnation of the resin can be suppressed. In addition, the tacking property of a prepreg can be maintained.

The fiber reinforced composite material of the present invention can be produced by a method in which the above-described prepreg of the present invention is laminated in a predetermined form and pressurized and heated to cure the resin as an example. Herein, for example, a press molding method, an autoclave molding method, a bagging molding method, a wrapping method, and an internal pressure molding method are adopted as a method of providing heat and pressure.

The fiber reinforced composite material of the present invention can be widely used in aerospace applications, general industrial applications, and sports applications. More specifically, preferable examples of general industrial applications include structures such as automobiles, ships, and railway vehicles. Preferable examples of sports applications include applications such as golf shafts, fishing rods, and rackets of tennis and badminton.

EXAMPLES

Hereinafter, the present invention will be described in more detail with reference to Examples. However, the scope of the present invention is not limited only to these examples. The unit "part" of the composition ratio refers to part by mass unless otherwise noted. In addition, measurement of various properties (physical properties) was performed under the environment of a temperature of 23° C. and a relative humidity of 50% unless otherwise noted.

Materials Used in Examples and Comparative Examples (1) Component [A]: Epoxy Resin
 "Araldite®" MY0600 (aminophenol type epoxy resin, epoxy equivalent: 118 g/eq, number of epoxy groups: 3, manufactured by Huntsman Advanced Materials LLC)
 "jER®" 825 (bisphenol A epoxy resin, epoxy equivalent: 170 g/eq, number of epoxy groups: 2, manufactured by Mitsubishi Chemical Corporation)
 Glycidol (molecular weight: 74, epoxy equivalent: 74 g/eq, number of epoxy groups: 1, boiling point: 167° C., manufactured by Tokyo Chemical Industry Co., Ltd.)
(2) Component [B]: Aromatic Diamine
 3,3'-DAS (3,3'-diaminodiphenylsulfone, active hydrogen equivalent: 62 g/eq, number of active hydrogens: 4, manufactured by Mitsui Fine Chemicals, Inc.)
 Seikacure-S (4,4'-diaminodiphenylsulfone, active hydrogen equivalent: 62 g/eq, number of active hydrogens: 4, manufactured by Wakayama Seika Kogyo Co., Ltd.)
 "jER Cure®" WA (diethyltoluenediamine, active hydrogen equivalent: 45 g/eq, number of active hydrogens: 4, manufactured by Mitsubishi Chemical Corporation)
(3) Component [C]: A Compound Having a Boiling Point of 130° C. or More and a Molecular Weight m of 50 to 250, the Compound Having No Epoxy Group in the Molecule and Having Substantially No Curing Ability of an Epoxy Resin
 1,2-ethanediol (boiling point: 197° C., molecular weight m: 62, manufactured by Tokyo Chemical Industry Co., Ltd.)
 1,2-propanediol (boiling point: 188° C., molecular weight m: 76, manufactured by Tokyo Chemical Industry Co., Ltd.)
 1,2-hexanediol (boiling point: 245° C., molecular weight m: 118, manufactured by Tokyo Chemical Industry Co., Ltd.)
 N-methylpropionamide (boiling point: 223° C., molecular weight m: 87, manufactured by Tokyo Chemical Industry Co., Ltd.)
 N,N'-diphenylacetamide (boiling point (converted value): 410° C., molecular weight m: 211, manufactured by Tokyo Chemical Industry Co., Ltd.)
 1,2-octanediol (boiling point: 267° C., molecular weight m: 146, manufactured by Tokyo Chemical Industry Co., Ltd.)
(4) Other Compounds
 ethanol (boiling point: 78° C., molecular weight m: 46, manufactured by Tokyo Chemical Industry Co., Ltd.)
 N,N'-diphenyl-4-methoxybenzamide (boiling point: 468° C., molecular weight m: 303, manufactured by Tokyo Chemical Industry Co., Ltd.)

<Various Evaluation Methods>

The epoxy resin composition of each example was measured by using the following measurement methods.

(1) Three-Point Bending Measurement of Cured Resin

The uncured resin composition was defoamed in a vacuum, then heated at a rate of 1.7° C./min from 30° C. in a mold set to have a thickness of 2 mm with a 2 mm thick "Teflon®" spacer, held at a temperature of 125° C. for 5 hours, then heated at a rate of 1.7° C./min, and cured at a temperature of 225° C. for 2 hours to provide a plate-shaped cured resin having a thickness of 2 mm. A test piece having a width of 10 mm and a length of 60 mm was cut out from the cured resin, and an Instron universal testing machine (manufactured by Instron Inc.) was used to set the span to 32 mm, the crosshead speed to 2.5 mm/min, and the number of samples to n=6, and to perform three-point bending measurement according to JIS K7171 (1994), and the average values of the elastic modulus, the strength, and the elongation were defined as the elastic modulus, the strength, and the elongation of the cured resin, respectively.

(2) Measurement of Viscosity of Resin Composition

Using a dynamic viscoelasticity measuring apparatus ARES-G2 (manufactured by TA Instruments Inc.), an epoxy resin composition was set so that the distance between the upper and lower jigs was 1 mm by using flat parallel plates having a diameter of 40 mm as the upper and lower measuring jigs, and the initial viscosity of the epoxy resin composition at 70° C. in a torsion mode (measurement frequency: 0.5 Hz) and the viscosity in holding at 70° C. for 2 hours in a state of setting in the apparatus were each measured. In addition, the viscosity in holding at 70° C. for 2 hours was divided by the initial viscosity at 70° C. to provide a viscosity increase ratio.

Example 1

(Production of Resin Composition)

A resin composition was prepared by the following method.

100 parts of "Araldite®" MY0600 as the component [A] described in Table 1 was charged into a kneading apparatus, heated to a target temperature of 55 to 65° C. while being kneaded, 53 parts of 3,3'-DAS as the component [B] was added, and stirring was performed for 30 minutes. Thereafter, 5 parts of 1,2-ethanediol was added as the component [C], and stirring was further performed for 10 minutes to provide a resin composition.

In this case, the ratio H/E between the amount by mole, H, of active hydrogen of the component [B] and the amount by mole, E, of the epoxy group of the component [A] was 1.00. In addition, the ratio C/E of the amount by mole, C, of the component [C] to the amount by mole, E, of the epoxy group of the component [A] was 0.10. In addition, the theoretical molecular weight between crosslinking points, M, of the epoxy resin composition composed of the component [A] and component [B] was 216, the molecular weight m of the component [C] was 62, and m/M was 0.29.

As a result of three-point bending measurement of the cured resin of the obtained resin composition, the elastic modulus was 5.1 GPa, the strength was 225 MPa, and the elongation was 5.9%. As compared with Comparative Example 1 (without compounding of the component [C]) described later, excellent elastic modulus, strength, and elongation were obtained. In addition, the viscosity in holding at 70° C. for 2 hours was 2.2 times the initial viscosity at 70° C., providing a sufficient pot life.

Examples 2 to 10 and 12 and Reference Example 1

The components [A], [B] and [C] were compounded according to the compounding ratios in Tables 1 and 2 in the same procedure as in Example 1 to provide resin compositions.

The various measurement results of Examples are as shown in Tables 1 and 2, and excellent elastic modulus, strength, and elongation of the cured resin were obtained when the compounding of the resin composition was changed as in Examples 2 to 10 and 12 and Reference Example 1. In addition, the viscosity increase ratio was good.

Comparative Examples 1 to 10

The components [A] and [B] (and [C] or a substitute thereof) were compounded according to the compounding ratio in Table 2 in the same procedure as in Example 1 to provide resin compositions.

In Comparative Example 1, those corresponding to the component [C] was not compounded. When Comparative Example 1 is compared with Example 1, it is found that the elastic modulus, strength, and elongation of the cured resin are each improved by compounding the component [C], and particularly the strength and elongation are dramatically improved.

In Comparative Example 2, those corresponding to the component [C] was also not compounded. Comparison of Comparative Example 2 with Example 6 shows that compounding the component [C] dramatically improves the elastic modulus and strength of the cured resin.

In Comparative Example 3, ethanol was compounded instead of the component [C]. Ethanol does not satisfy the condition that the boiling point of the component [C] is 130° C. or more and the condition that the molecular weight m is 50 or more and 250 or less. Comparison between Comparative Example 3 and Example 1 shows that the elastic modulus, strength, and elongation of the resulting cured resin are improved by compounding the component [C] satisfying the requirements that the boiling point is 130° C. or more and the molecular weight m is 50 or more and 250 or less.

In Comparative Example 4, N,N'-diphenyl-4-methoxybenzamide was compounded instead of the component [C]. N,N'-diphenyl-4-methoxybenzamide does not satisfy the condition that the molecular weight m in the component [C] is 50 or more and 250 or less. In addition, there is not satisfied the condition that the ratio m/M between the theoretical molecular weight between crosslinking points, M, of the epoxy resin composition and the molecular weight m of the component [C] is 0.10 or more and 0.60 or less. Comparison between Comparative Example 4 and Example 1 shows that satisfying the above conditions improves the elastic modulus, strength, and elongation of the resulting cured resin.

In Comparative Example 5, glycidol was compounded instead of the component [C]. Glycidol has an epoxy group in the molecule. Comparison between Comparative Example 5 and Example 1 shows that the component [C] having no epoxy group in the molecule improves the elastic modulus, strength, and elongation of the resulting cured resin.

Comparative Examples 6 and 7 does not satisfy the condition that the ratio H/E between the amount by mole, E, of the epoxy group of the component [A] and the amount by mole, H, of active hydrogen of the component [B] is 0.50 or more and 1.30 or less. Comparison between Comparative Examples 6 and 7 and Example 1 shows that satisfying the above conditions improves the strength of the resulting cured resin.

Comparative Example 8 does not satisfy the condition that the ratio C/E between the amount by mole, E, of the epoxy group of the component [A] and the amount by mole, C, of the epoxy group of the component [C] is 0.01 or more and 0.20 or less. Comparison between Comparative Example 8 and Example 1 shows that satisfying the above conditions improves the elastic modulus, strength, and elongation of the resulting cured resin.

Comparative Example 9 does not satisfy the condition that the ratio m/M between the theoretical molecular weight between crosslinking points, M, of the epoxy resin composition including the components [A] and [B] and the molecular weight m of the component [C] is 0.10 or more and 0.60 or less. Comparison between Comparative Example 9 and Example 1 shows that satisfying the above conditions improves the elastic modulus, strength, and elongation of the resulting cured resin.

Comparative Example 10 does not satisfy the condition that the viscosity of the epoxy resin composition held at 70° C. for 2 hours is 5.0 times or less the initial viscosity at 70° C. Therefore, the composition had a large increase in viscosity in the step of mixing the epoxy resin and a short pot life. Comparison between Comparative Example 10 and Example 1 shows that satisfying the above conditions provides a long pot life of the resulting resin composition and thus excellent handleability.

Figure 1:
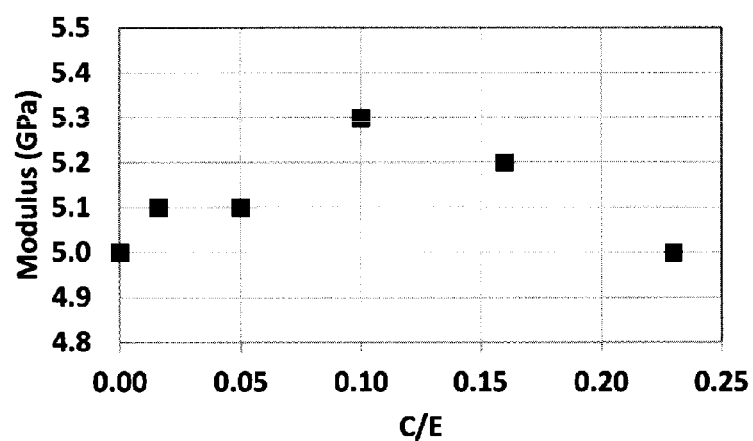
FIG. 1 is a graph showing the relationship between the ratio C/E of the amount by mole, C, of the component [C] to the amount by mole, E, of epoxy groups of the component [A], and the elastic modulus, in Example 2 (C/E=0.10), Example 5 (C/E=0.02), Example 6 (C/E=0.05), Example 7

Herein, comparing Example 2, Example 5, Example 6, Example 7, Comparative Example 1, and Comparative Example 8, these are epoxy resin compositions including the same component [A], component [B], and component [C], and differ only in the compounding amount of the component [C]. FIG. 1 shows the relationship between the ratio C/E of the amount by mole, C, of the component [C] to the amount by mole, E, of the epoxy group of the component [A] and the elastic modulus, and FIG. 2 shows the relationship with the strength. From FIGS. 1 and 2, it is found that C/E is 0.01 or more and 0.20 or less in the epoxy resin composition of the present invention, thereby providing a cured product excellent in elastic modulus, strength, and elongation. In addition, it is found that C/E is 0.07 or more and 0.20 or less, thereby providing a cured product particularly excellent in elastic modulus, and C/E is 0.01 or more and 0.13 or less, thereby providing a cured product particularly excellent in strength.

Furthermore, Example 1, Example 2, Example 3, Example 4, Comparative Example 1, and Comparative Example 9 are epoxy resin compositions including the same component [A] and component [B] at the same compounding ratio, and the type of the component [C] is different or not used. The relationship between m/M and the elastic modulus is shown in FIG. 3, and the relationship with the strength is shown in FIG. 4. Comparison of Example 1, Example 2, Example 3, Example 4, Comparative Example 1, and Comparative Example 9 in FIGS. 3 and 4 shows that the relationship of 0.10 m/M 0.60 is satisfied in the resin composition of the present invention, thereby providing a cured product excellent in the elastic modulus and strength of the cured resin. In addition, when the relationship of 0.30<m/M<0.50 is satisfied, it is found that a cured product particularly excellent in elastic modulus, strength, and elongation is obtained.

TABLE 1

| | | Example 1 | Example 2 | Example 3 | Example 4 | Example 5 | Example 6 |
|---|---|---|---|---|---|---|---|
| Component [A] | "Araldite (registered trademark)" MY0600 | 100 | 100 | 100 | 100 | 100 | 100 |
| | "jER" ® 825 | — | — | — | — | — | — |
| | Glycidol | — | — | — | — | — | — |
| Component [B] | 3,3'-DAS | 53 | 53 | 53 | 53 | 53 | 53 |
| | SEIKACURE S | — | — | — | — | — | — |
| | "jER Cure" (registered trademark) WA | — | — | — | — | — | — |
| Component [C] | 1,2-Ethanediol | 5 | — | — | — | — | — |
| | 1,2-Propanediol | — | 7 | — | — | 1 | 3 |
| | 1,2-Hexanediol | — | — | 10 | — | — | — |
| | N-methylpropionamide | — | — | — | 7 | — | — |
| | N,N'-diphenylacetamide | — | — | — | — | — | — |
| | 1,2-Octanediol | — | — | — | — | — | — |
| Other compound [C'] | Ethanol | — | — | — | — | — | — |
| | N,N'-diphenyl-4-methoxybenzamide | — | — | — | — | — | — |
| Properties of resin composition | H/E | 1.00 | 1.00 | 1.00 | 1.00 | 1.00 | 1.00 |
| | Boiling point of [C] or [C'] (° C.) | 197 | 188 | 245 | 220 | 188 | 188 |
| | Molecular weight m of [C] or [C'] | 62 | 76 | 118 | 87 | 76 | 76 |
| | Theoretical molecular weight between crosslinking points, M | 216 | 216 | 216 | 216 | 216 | 216 |
| | m/M | 0.29 | 0.35 | 0.55 | 0.40 | 0.35 | 0.35 |
| | C/E | 0.10 | 0.10 | 0.10 | 0.10 | 0.02 | 0.05 |
| | Initial viscosity at 70° C. (Pa · s) | 0.8 | 0.5 | 0.4 | 0.5 | 0.9 | 0.8 |
| | Viscosity in holding at 70° C. for 2 hours (Pa · s) | 1.8 | 1.1 | 0.9 | 0.8 | 1.4 | 1.4 |
| | Viscosity increase ratio in holding at 70° C. for 2 hours (times) | 2.2 | 2.2 | 2.2 | 1.5 | 1.6 | 1.7 |
| Properties of cured resin | Elastic modulus (GPa) | 5.1 | 5.3 | 5.1 | 5.4 | 5.0 | 5.1 |
| | Strength (MPa) | 225 | 225 | 201 | 240 | 222 | 222 |
| | Elongation (%) | 5.9 | 5.5 | 4.8 | 6.3 | 5.6 | 5.8 |

| | | Example 7 | Example 8 | Example 9 | Example 10 | Reference Example 1 |
|---|---|---|---|---|---|---|
| Component [A] | "Araldite (registered trademark)" MY0600 | 100 | 100 | 100 | — | — |
| | "jER" ® 825 | — | — | — | 100 | 100 |
| | Glycidol | — | — | — | — | — |
| Component [B] | 3,3'-DAS | 53 | 32 | 63 | 35 | 29 |
| | SEIKACURE S | — | — | — | — | — |
| | "jER Cure" (registered trademark) WA | — | — | — | — | — |
| Component [C] | 1,2-Ethanediol | — | 5 | 5 | — | — |
| | 1,2-Propanediol | 10 | — | — | 4 | 4 |
| | 1,2-Hexanediol | — | — | — | — | — |
| | N-methylpropionamide | — | — | — | — | — |
| | N,N'-diphenylacetamide | — | — | — | — | — |
| | 1,2-Octanediol | — | — | — | — | — |

TABLE 1-continued

| | | | | | | |
|---|---|---|---|---|---|---|
| Other compound [C'] | Ethanol | — | — | — | — | — |
| | N,N'-diphenyl-4-methoxybenzamide | — | — | — | — | — |
| Properties of resin composition | H/E | 1.00 | 0.60 | 1.20 | 1.00 | 0.80 |
| | Boiling point of [C] or [C'] (° C.) | 188 | 197 | 197 | 188 | 188 |
| | Molecular weight m of [C] or [C'] | 76 | 62 | 62 | 76 | 76 |
| | Theoretical molecular weight between crosslinking points, M | 216 | 310 | 231 | 464 | 554 |
| | m/M | 0.35 | 0.20 | 0.27 | 0.16 | 0.14 |
| | C/E | 0.16 | 0.10 | 0.10 | 0.10 | 0.10 |
| | Initial viscosity at 70° C. (Pa · s) | 0.4 | 0.5 | 1.2 | 0.4 | 0.3 |
| | Viscosity in holding at 70° C. for 2 hours (Pa · s) | 0.8 | 1.0 | 2.9 | 0.6 | 0.5 |
| | Viscosity increase ratio in holding at 70° C. for 2 hours (times) | 2.1 | 2.0 | 2.4 | 1.6 | 1.6 |
| Properties of cured resin | Elastic modulus (GPa) | 5.2 | 5.3 | 5.0 | 3.8 | 3.6 |
| | Strength (MPa) | 180 | 216 | 220 | 170 | 161 |
| | Elongation (%) | 3.9 | 4.8 | 5.8 | 10 or more | 10 or more |

TABLE 2

| | | Example 12 | Comparative Example 1 | Comparative Example 2 | Comparative Example 3 | Comparative Example 4 | Comparative Example 5 |
|---|---|---|---|---|---|---|---|
| Component [A] | "Araldite (registered trademark)" MY0600 | — | 100 | — | 100 | 100 | 100 |
| | "jER" ® 825 | 100 | — | 100 | — | — | — |
| | Glycidol | — | — | — | — | — | 6 |
| Component [B] | 3,3'-DAS | 35 | 53 | 35 | 53 | 53 | 58 |
| | SEIKACURE S | — | — | — | — | — | — |
| | "jER Cure" (registered trademark) WA | — | — | — | — | — | — |
| Component [C] | 1,2-Ethanediol | — | — | — | — | — | — |
| | 1,2-Propanediol | — | — | — | — | — | — |
| | 1,2-Hexanediol | — | — | — | — | — | — |
| | N-methylpropionamide | — | — | — | — | — | — |
| | N,N'-diphenylacetamide | 12 | — | — | — | — | — |
| | 1,2-Octanediol | — | — | — | — | — | — |
| Other compound [C'] | Ethanol | — | — | — | 4 | — | — |
| | N,N'-diphenyl-4-methoxybenzamide | — | — | — | — | 17 | — |
| Properties of resin composition | H/E | 1.00 | 1.00 | 1.00 | 1.00 | 1.00 | 1.00 |
| | Boiling point of [C] or [C'] (° C.) | 410 | — | — | 78 | 468 | — |
| | Molecular weight m of [C] or [C'] | 211 | — | — | 46 | 303 | — |
| | Theoretical molecular weight between crosslinking points, M | 464 | 216 | 474 | 216 | 216 | 246 |
| | m/M | 0.45 | — | — | 0.21 | 1.40 | — |
| | C/E | 0.10 | 0.00 | 0.00 | 0.00 | 0.00 | 0.00 |
| | Initial viscosity at 70° C. (Pa · s) | 0.2 | 1.0 | 0.5 | 0.8 | 0.3 | 0.6 |
| | Viscosity in holding at 70° C. for 2 hours (Pa · s) | 0.3 | 1.7 | 1.2 | 1.7 | 0.5 | 1.4 |
| | Viscosity increase ratio in holding at 70° C. for 2 hours (times) | 1.7 | 1.6 | 2.7 | 2.1 | 1.7 | 2.4 |
| Properties of cured resin | Elastic modulus (GPa) | 3.9 | 5.0 | 3.4 | 5.0 | 4.9 | 5.0 |
| | Strength (MPa) | 171 | 181 | 152 | 180 | 172 | 188 |
| | Elongation (%) | 8.2 | 4.2 | 10 or more | 4.2 | 4.3 | 4.4 |
| | | Comparative Example 6 | Comparative Example 7 | Comparative Example 8 | Comparative Example 9 | Comparative Example 10 | |
| Component [A] | "Araldite (registered trademark)" MY0600 | 100 | 100 | 100 | 100 | 100 | |
| | "jER" ® 825 | — | — | — | — | — | |
| | Glycidol | — | — | — | — | — | |

TABLE 2-continued

| | | | | | | |
|---|---|---|---|---|---|---|
| Component [B] | 3,3'-DAS | 24 | 74 | 53 | 53 | 6 |
| | SEIKACURE S | — | — | — | — | 6 |
| | "jER Cure" (registered trademark) WA | — | — | — | — | 29 |
| Component [C] | 1,2-Ethanediol | 5 | 5 | — | — | — |
| | 1,2-Propanediol | — | — | 15 | — | 1 |
| | 1,2-Hexanediol | — | — | — | — | — |
| | N-methylpropionamide | — | — | — | — | — |
| | N,N'-diphenylacetamide | — | — | — | — | — |
| | 1,2-Octanediol | — | — | — | 13 | — |
| Other compound [C'] | Ethanol | — | — | — | — | — |
| | N,N'-diphenyl-4-methoxybenzamide | — | — | — | — | — |
| Properties of resin composition | H/E | 0.45 | 1.40 | 1.00 | 1.00 | 0.84 |
| | Boiling point of [C] or [C'] (° C.) | 197 | 197 | 188 | 267 | 188 |
| | Molecular weight m of [C] or [C'] | 62 | 62 | 76 | 146 | 76 |
| | Theoretical molecular weight between crosslinking points, M | 389 | 246 | 216 | 216 | 215 |
| | m/M | 0.16 | 0.25 | 0.35 | 0.68 | 0.35 |
| | C/E | 0.10 | 0.10 | 0.23 | 0.00 | 0.02 |
| | Initial viscosity at 70° C. (Pa · s) | 0.3 | 1.6 | 0.2 | 0.2 | 0.2 |
| | Viscosity in holding at 70° C. for 2 hours (Pa · s) | 0.6 | 4.5 | 0.4 | 0.5 | 1.4 |
| | Viscosity increase ratio in holding at 70° C. for 2 hours (times) | 1.8 | 2.8 | 2.2 | 2.3 | 7.5 |
| Properties of cured resin | Elastic modulus (GPa) | 5.4 | 4.9 | 5.0 | 4.9 | — |
| | Strength (MPa) | 161 | 184 | 161 | 193 | — |
| | Elongation (%) | 3.9 | 6.2 | 3.6 | 4.7 | — |

The invention claimed is:

1. An epoxy resin composition comprising the following components [A] to [C]:

[A]: epoxy resin;

[B]: aromatic diamine; and

[C]: a compound having a boiling point of 130° C. or more and a molecular weight m of 50 or more and 250 or less, the compound having no epoxy group in a molecule and having substantially no ability to cure an epoxy resin, and satisfying the following conditions (1) to (5):

(1) a ratio H/E between an amount by mole, E, of epoxy groups in the component [A] and an amount by mole, H, of active hydrogen in the component [B] is 0.50 or more and 1.30 or less;

(2) at least a part of the component [C] satisfies 0.10 or more and 0.60 or less in a ratio m/M between the molecular weight m thereof and a theoretical molecular weight between crosslinking points, M, of a cured product of the epoxy resin composition;

(3) a ratio C/E between an amount by mole, E, of epoxy groups of the component [A] and an amount by mole, C, of the component [C] satisfying the condition (2) is 0.01 or more and 0.20 or less;

(4) the epoxy resin composition has a viscosity after being held at 70° C. for 2 hours that is 5.0 times or less than an initial viscosity at 70° C.; and (5) a theoretical molecular weight between crosslinking points, M, of a cured product of the epoxy resin composition is 400 or less.

2. The epoxy resin composition according to claim 1, wherein the component [C] is a compound having at least one functional group selected from the group consisting of an amide group, a ketone group, and a hydroxyl group in a molecule.

3. A prepreg comprising the epoxy resin composition according to claim 1 and a reinforcing fiber.

4. A fiber reinforced composite material comprising a cured product of the epoxy resin composition according to claim 1 and a reinforcing fiber.

* * * * *